(12) United States Patent (10) Patent No.: US 8,672,103 B2
Tatsuda (45) Date of Patent: Mar. 18, 2014

(54) MAIN SHAFT DRIVE FOR MACHINE TOOL

(75) Inventor: Yoshinori Tatsuda, Kanazawa (JP)

(73) Assignee: Tsudakoma Kogyo Kabushiki Kaisha, Ishikawa-Ken (JP)

( * ) Notice: Subject to any disclaimer, the term of this patent is extended or adjusted under 35 U.S.C. 154(b) by 361 days.

(21) Appl. No.: 13/157,053

(22) Filed: Jun. 9, 2011

(65) Prior Publication Data

US 2012/0024644 A1 Feb. 2, 2012

(30) Foreign Application Priority Data

Jul. 29, 2010 (JP) ................................ 2010-170229

(51) Int. Cl.
*F16D 65/00* (2006.01)

(52) U.S. Cl.
USPC ....... 188/264 B; 188/264 R; 184/5; 184/6.17; 184/48.2; 269/21; 269/309; 269/310; 269/903

(58) Field of Classification Search
USPC ............ 188/264 B, 264 R; 269/21, 309, 310, 269/903; 184/5, 6.17, 6.18, 6.26, 48.2
See application file for complete search history.

(56) References Cited

U.S. PATENT DOCUMENTS 3,126,768 A * 3/1964 Gondek .......................... 269/21
4,183,545 A * 1/1980 Daly ................................ 279/3
4,656,951 A * 4/1987 Kimura et al. ................. 108/20
7,931,131 B2 * 4/2011 Tatsuda ......................... 188/170
8,398,061 B2 * 3/2013 Tatsuda .......................... 269/57
8,439,338 B2 * 5/2013 Taniguchi et al. .............. 269/55
2010/0123278 A1 * 5/2010 Tatsuda .......................... 269/57

FOREIGN PATENT DOCUMENTS

JP 2000-218404 A 8/2000
JP 2008062315 A * 3/2008

* cited by examiner

*Primary Examiner* — Thomas J Williams
*Assistant Examiner* — Mariano Sy
(74) *Attorney, Agent, or Firm* — Yoshida & Associates, LLC (57) ABSTRACT

A main shaft drive includes a supply groove that opens to a friction surface, that extends so as to surround a main shaft within a contact range where the friction surface and a pressing surface oppose each other, and that includes an intersecting groove and a discharge opening. The intersecting groove extends in a direction of intersection with a circumference in which a rotational center of the main shaft is a center. The discharge opening is connected to a location that is outside the contact range. By opening a nozzle hole, used for supplying lubricant, towards the supply groove, as the main shaft rotates, four intersecting grooves move relative to the contact range, so that the lubricant is supplied to the four moved intersecting grooves. Therefore, the lubricant easily reaches a location within the contact range where the friction surface and the pressing surface oppose each other.

2 Claims, 10 Drawing Sheets

MAIN SHAFT DRIVE FOR MACHINE TOOL

BACKGROUND OF THE INVENTION

1. Field of the Invention

The present invention relates to a main shaft drive for a machine tool. More particularly, the present invention relates to a main shaft drive for a machine tool including a rotation-resistance applying device that applies rotation resistance to a main shaft by causing a pressing surface of a pressing member to press-contact a friction surface of a press member when the main shaft that is rotatably supported at a frame is rotationally driven.

2. Description of the Related Art

Hitherto, as a main shaft drive used in a machine tool, a rotation index table device is known. In the rotation index table device, a circular table on which a workpiece (object to be processed) is placed is secured to a main shaft, and the circular table is rotated by rotationally driving the main shaft. The rotation index table device is used for indexing an angular position of the circular table by rotationally driving the main shaft, and processing the workpiece at the indexed angular position. The rotation index table device of this type includes a clamp device for holding the circular table at the indexed angular position (that is, the indexed position). The clamp device is used for causing the main shaft (circular table) to be in a rotation prevention state at the indexed position.

Ordinarily, with the clamp device being set in a clamped state, the rotation of the circular table is stopped, and a workpiece is processed. However, the workpiece may be finished while continuously rotating the workpiece with the clamp device being set in an unclamped state. In this case, the rotation index table device receives a load from a cutter that processes the workpiece. The load constantly varies even under a fixed processing condition. Therefore, a state of rotation of the main shaft caused by the rotation index table device may be affected by the variation of the load received from the cutter, as a result of which pulsation may occur. The details are as follows.

For example, when a direct drive motor (hereunder referred to as "DD motor") that directly rotationally drives the main shaft without using a drive transmission means such as a worm gear is used, rotation of the DD motor is controlled while correcting deviation of a rotation angle (rotation amount) of the main shaft, on the basis of the rotation angle (rotation amount) of the main shaft that has been detected. However, since the control of the DD motor may not satisfactorily follow variations in the deviation of the rotation angle caused by the variation of the load received from the cutter, the rotation of the DD motor is not necessarily uniform, as a result of which pulsation may occur in the rotation of the main shaft. When the drive transmission means such as a worm gear is used as driving means of the main shaft, backlash may exist in the worm gear, as a result of which the rotational speed of a driving side of gears that engage each other change due to the variation of the load received from the cutter. In this case, driven-side (main-shaft side) gears rotate independently of the driving side within a backlash range due to inertia, thereby causing pulsation to occur in the rotation of the main shaft.

When pulsation occurs in the rotation of the main shaft, pulsation also occurs in a rotation of the circular table secured to the main shaft. As a result, surface roughness of a finishing surface of a workpiece that is finished while rotating the circular table is increased. As a related art that provides a solution to the problem that such pulsation occurs, a main shaft drive discussed in Japanese Unexamined Patent Application Publication No. 2000-218404 (Patent Document 1) is provided.

Patent Document 1 relates to a lathe serving as a main shaft drive. Since an error in a main shaft angle caused by elastic deformation of a rotation transmission system or backlash of a gear occurs due to variation in a cutting load, a brake device is provided at the main shaft to prevent the error and the backlash from occurring, so that, when a workpiece is processed while rotating the workpiece, the brake device constantly applies a certain load to the main shaft. When an error of the main shaft angle occurs as the cutting load varies, pulsation consequentially occurs in the rotation of the main shaft.

In the case where a certain load (rotation resistance) is constantly applied to the main shaft by the brake device when processing a workpiece while rotating the workpiece, a friction surface of a rotating member and a pressing surface of a brake shoe that slide when they press-contact each other are worn. When the pressing surface of the brake shoe and the friction surface of the rotating member are worn, states of the pressing surface and the friction surface change due to the wear. This considerably changes the rotation resistance acting upon the main shaft. As a result, as the wear progresses, pulsation occurs again in the rotation of the main shaft, thereby increasing the surface roughness of the finishing surface of the workpiece.

Therefore, when the workpiece is rotated and processed while the brake device applies a constant rotation resistance to the main shaft, in order to reduce the wear, it is necessary to lubricate the pressing surface of the brake shoe and the friction surface of the rotating member. Although the purpose discussed in the aforementioned Patent Document 1 differs from the purpose of suppressing wear, it discusses that the main shaft drive (lathe) is provided with lubricant supplying means for supplying a lubricant to the brake device provided at the main shaft.

However, in the lubricant supplying means discussed in the aforementioned Patent Document 1, the lubricant is supplied to the pressing surface of the brake shoe and the friction surface of the rotating member by causing drops of the lubricant to fall from nozzle holes. Therefore, it is difficult for the lubricant to reach a portion where the brake shoe press-contacts the rotating member due to, for example, the influence of the viscosity of the lubricant and the centrifugal force generated by the rotation of the rotating member. Therefore, the pressing surface and the friction surface are not sufficiently lubricated, as a result of which oil films run out. Consequently, the pressing surface of the brake shoe and the friction surface of the rotating member are worn. As a result, wear cannot be sufficiently suppressed.

SUMMARY OF THE INVENTION

The present invention is achieved to overcome such problems, and its object is to make it possible to stably maintain the magnitude of rotational resistance applied to a main shaft by suppressing wear of a friction surface and a pressing surface in a main shaft drive in a machine tool.

To this end, according to the present invention, a supply groove that opens to at least one of a pressing surface of a pressing member and a friction surface of a press member is provided.

The supply groove extends so as to surround the main shaft in a range where the friction surface and the pressing surface oppose each other, and includes a section and a discharge opening. The section extends in a direction of intersection with a circumference in which a rotational center of the main shaft serves as a center. The discharge opening is connected to a location outside the range where the friction surface and the pressing surface oppose each other. A nozzle hole for supplying lubricant opens towards the supply groove. Here, the phrase "a circumference in which a rotational center of the main shaft serves as a center" refers to an imaginary circle in which the rotational center of the main shaft serves as a center.

According to the present invention, in one form, the supply groove may include at least two discharge openings for discharging the lubricant.

According to the present invention having the above-described structure, the supply groove extends so as to surround the main shaft in the range where the friction surface and the pressing surface oppose each other, and the lubricant is supplied so as to be discharged from the discharge opening by passing the section extending in a direction of intersection with a direction along the circumference in which the rotational center of the main shaft serves as a center. Therefore, as the main shaft rotates, the section extending in a direction of intersection with a direction along the circumference and a range opposing the section move relative to each other. This makes it easier for the lubricant to reach a location within the range where the friction surface and the pressing surface oppose each other. This makes it possible to suppress running out of oil films at the friction surface and the pressing surface, to reduce wear of the friction surface and the pressing surface. Therefore, it is possible to maintain the magnitude of the rotation resistance applied to the main shaft by a rotation resistance applying device.

According to the one form of the present invention, a path of passage of the lubricant when the lubricant is supplied from the nozzle hole to the supply groove and is discharged from the discharge openings is divided into paths (portions) extending in different directions towards the two discharge openings that are positioned at respective sides of the corresponding nozzle hole when viewed from the corresponding nozzle hole. By this, even if the portion of the supply groove extending to one of the discharge openings is clogged with wear powder, it is possible to allow the lubricant supplied from the nozzle hole to the supply groove to pass through the other discharge opening. Therefore, it is possible to prevent the friction surface and the pressing surface from being raised by the pressure of the lubricant. Consequently, it is possible to maintain the rotation resistance applied to the main shaft by the rotation resistance applying device to a predetermined magnitude.

DESCRIPTION OF THE PREFERRED EMBODIMENT

An embodiment of the present invention will hereunder be described with reference to FIGS. 1 to 3. In the embodiment, a rotating table device 1 is used as an exemplary main shaft drive for a machine tool including a rotation resistance applying device 10. The present invention is applied to the rotating table device. In the description below, "axial direction" refers to the direction of an axis of rotation of a main shaft 4a, and "radial direction" refers to a radial direction of the main shaft 4a and a circular table 5, that are concentrically disposed. In the axial direction, a circular-table-5 side of each member is defined as an upper side (upper end, upper surface), and the opposite side of each member is defined as the lower side (lower end, lower surface).

Figure 1:
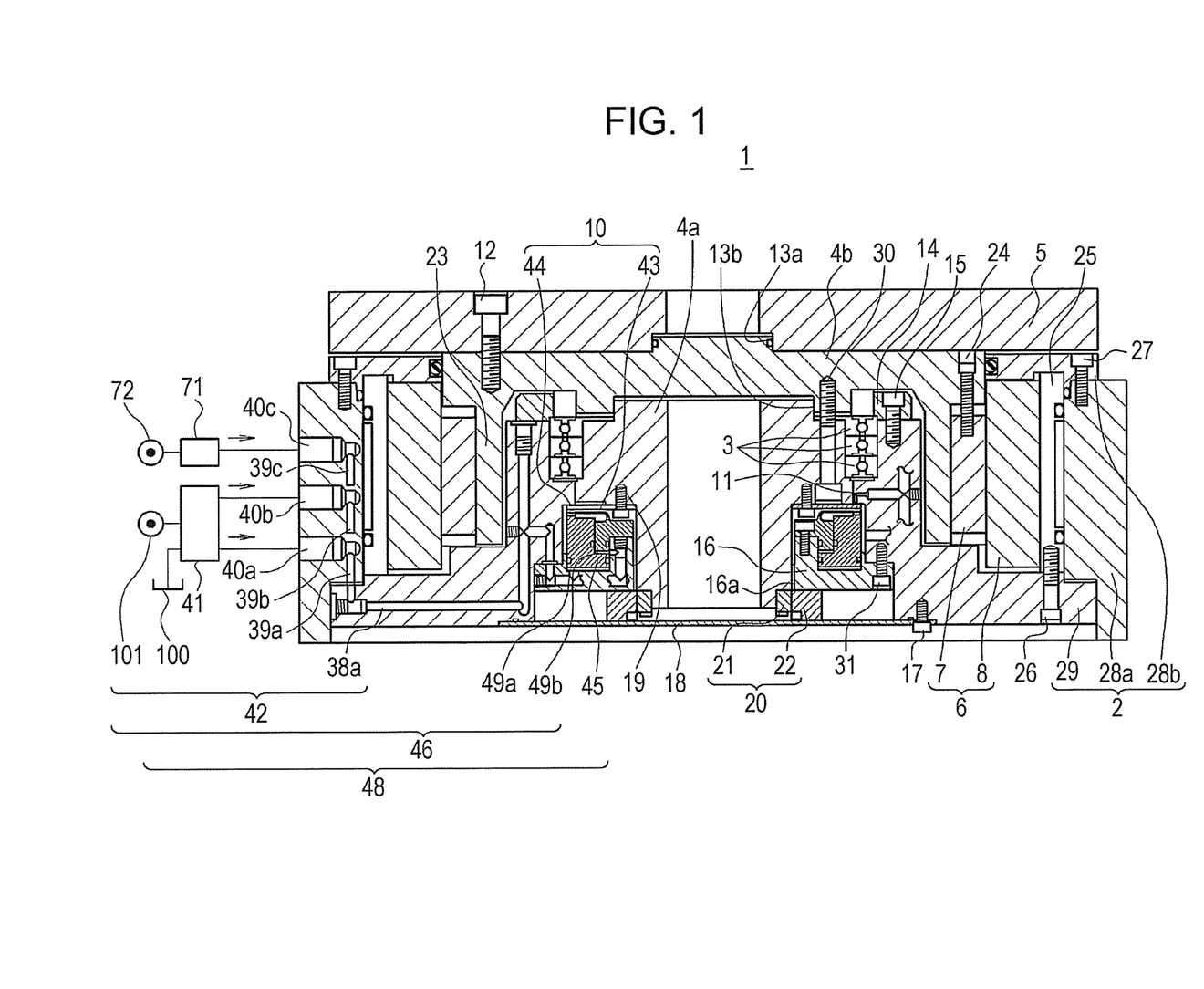
FIG. 1 shows an exemplary structure of a main shaft drive for a machine tool according to an embodiment of the present invention.

FIG. 1 shows the entire rotating table device 1 according to the embodiment. In the rotating table device 1, a jig and a workpiece to be processed are placed on a surface of the circular table 5 mounted to the main shaft 4a. The illustrated rotating table device 1 includes the rotation resistance applying device 10 that applies rotation resistance to the main shaft 4a. The illustrated rotating table device 1 is placed horizontally so that the axis of rotation of the main shaft 4a is disposed substantially in a perpendicular direction.

Figure 2:
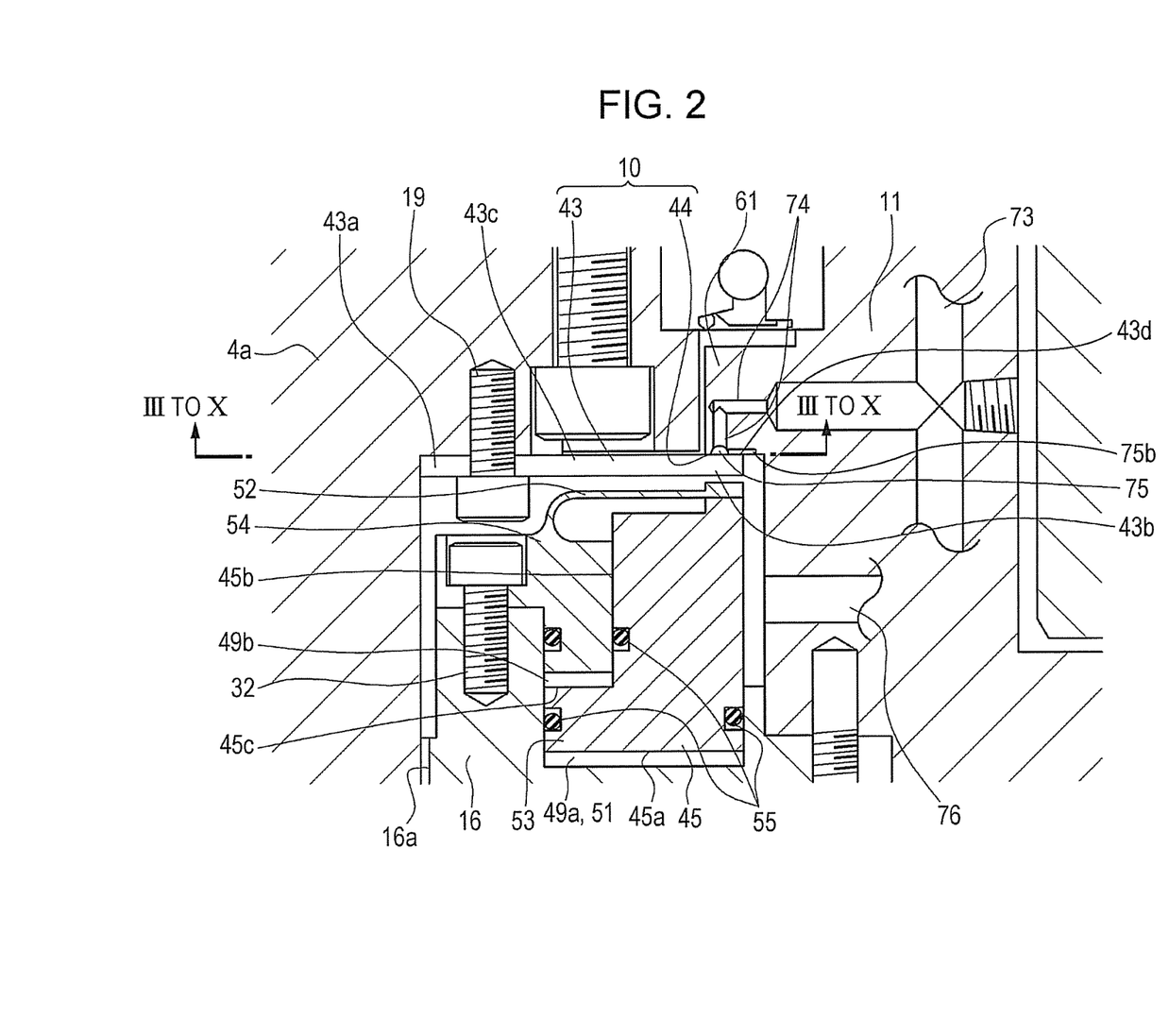
FIG. 2 is an enlarged view of a portion of the main shaft drive according to the embodiment.

FIG. 2 is an enlarged view of a portion of the rotation resistance applying device 10 according to the embodiment. In the rotation resistance applying device 10, a pressing surface 43d of a sliding disc 43 mounted to the main shaft 4a press-contacts a friction surface 44 of a base portion 11 at a frame 2, so that pressing force used to apply rotation resistance to the main shaft 4a always acts upon the friction surface 44.

First, with reference to FIG. 1, the structure of the rotating table device 1 will be described. As shown in FIG. 1, the rotating table device 1 includes the frame 2, the main shaft 4a rotatably supported by the frame 2, a flange 4b and the circular table 5 (which are mounted to the main shaft 4a), a DD motor 6 serving as a driving device that rotationally drives the main shaft 4a, and a clamp device 48 that applies rotation resistance to the main shaft 4a.

A portion of the frame 2 that is set with respect to a machine tool is formed as a flat surface. The frame 2 is formed by forming casing members 28a and 28b and a base member 29 as separate members and combining these members 28a, 28b, and 29 with a plurality of mounting bolts 27. The base member 29 is provided with the cylindrical base portion 11 that surrounds the main shaft 4a. The cylindrical base portion 11 is formed as a separate single member, and is mounted using, for example, a bolt.

The main shaft 4a is inserted in the cylindrical base portion 11 in the frame 2, and is supported by bearings 3 so as to be rotatable with respect to the frame 2. A flange 4b is mounted to one end of the main shaft 4a, and the circular table 5 is mounted to the flange 4b. The other end of the main shaft 4a is inserted in a hole 16a of a disc-shaped protruding member 16, and protrudes from the hole 16a. The protruding member 16 is mounted to an inner periphery of the base member 29 using a plurality of mounting bolts 31.

With the circular table 5 being positioned with respect to a protrusion of the flange 4b by fitting the circular table 5 at a center hole 13a, the circular table 5 is mounted to the flange 4b using a plurality of mounting bolts 12.

With the flange 4b being positioned by fitting the flange 4b to the one end of the main shaft 4a at a center hole 13b, the flange 4b is mounted to an end surface of the main shaft 4a using a plurality of mounting bolts 30. A cylindrical holding section 23 extending in a direction of the axis of rotation of the main shaft 4a from a side opposite to the circular table 5 is integrated to the flange 4b. The holding section 23 surrounds the base portion 11. Although the holding section 23 is integrated to the flange 4b, the holding section 23 may be mounted to the flange 4b as a separate member. The portion where the holding section 23 is provided is not limited to the flange 4b. The holding section 23 may be integrated to the circular table 5 or the main shaft 4a, or may be provided at the circular table 5 or the main shaft 4a as a separate member. The circular table 5, the flange 4b, and the main shaft 4a may be integrated to each other.

The main shaft 4a is supported by the bearings 3 that are provided between an outer peripheral surface of the main shaft 4a and an inner peripheral surface of the base portion 11. In the embodiment shown in FIG. 1, three bearings 3 are combined for supporting the main shaft 4a. With an inner ring side of each of these bearings 3 being interposed between a stepped portion at the outer peripheral surface of the main shaft 4a and a portion surrounding the center hole 13b at the flange 4b, the inner ring side of each bearing 3 is secured to the main shaft 4a. With an outer ring side of each bearing 3 being interposed between a stepped portion at the inner peripheral surface of the base portion 11 and an annular bearing holding section 14 (mounted to an end surface of the base portion 11 using a mounting bolt 15), the outer ring side of each bearing 3 is secured to the base portion 11.

The sliding disc 43 is mounted to the main shaft 4a. The sliding disc 43 is an elastically deformable member formed of a thin plate having the shape of a disc, and has a through hole for passing the main shaft 4a therethrough. The sliding disc 43 is secured to the main shaft 4a using a mounting bolt 19 at an inner peripheral side (through-hole side) thereof.

A detection ring 21 constituting a portion of a rotation detector 20 is mounted to the other end of the main shaft 4a protruding from the hole 16a of the protruding member 16. The rotation detector 20 detects a rotation angle (rotation amount) of the main shaft 4a. The rotation detector 20 includes the detection ring 21, mounted to the main shaft 4a, and a detection sensor 22, mounted to the protruding member 16 at a side of the frame 2. A space at an outer periphery of the main shaft 4a at the other end of the shaft 4a where the rotation detector 20 is provided is covered with a cover member 18. The cover member 18 is mounted to the base member 29 using a mounting bolt 17.

The main shaft 4a is rotationally driven by a driving device. As the driving device, the DD motor 6 that rotationally drives the main shaft 4a without using drive transmission means such as a gear is used. The DD motor 6 is concentrically disposed with respect to the main shaft 4a along the axis of rotation of the main shaft 4a. The DD motor 6 includes a motor rotor 7 and a motor stator 8. That is, the DD motor 6 is what is called an inner-rotor-type DD motor. The DD motor 6 is connected to a controlling device of the machine tool (not shown). Driving of the DD motor 6 is controlled by the controlling device.

While the motor rotor 7 is fitted to the outer peripheral surface of the holding section 23 at the flange 4b, the motor rotor 7 is mounted to the flange 4b with a mounting bolt 24 inserted from a flange-4b side so as to be incapable of rotating relative to the flange 4b. Therefore, the motor rotor 7 is in a state in which it is incapable of rotating relative to the main shaft 4 to which the circular table 5 is secured.

The motor stator 8 is disposed so as to surround an outer peripheral surface of the motor rotor 7. That is, the motor stator 8 is mounted to the frame 2 so that its inner peripheral surface faces the outer peripheral surface of the motor rotor 7 and so that a slight gap is formed between the outer peripheral surface of the motor rotor 7 and the inner peripheral surface of the motor stator 8. The motor stator 8 is fitted to an inner peripheral surface of a stator sleeve 25 so as to be incapable of rotating. The stator sleeve 25 is mounted to the frame 2 using a mounting bolt 26 inserted from a base-member-29 side of the frame 2, while the stator sleeve 25 is fitted to an inner peripheral surface of the casing member 28a of the frame 2. Therefore, within the frame 2, the motor stator 8 is incapable of rotating relative to the frame 2.

The clamp device 48 includes an annular clamp piston 45 and a pressing-force applying device 46. The pressing-force applying device 46 includes an operating fluid supplying mechanism 42, a first pressure chamber 49a, and a second pressure chamber 49b.

The operating fluid supplying mechanism 42 includes a first port 40a and a second port 40b, a first communicating path 39a and a second communicating path 39b, a first flow path 38a and a second flow path (only the first flow path 38a is shown in FIG. 1), an operating fluid supply source 101, an operating fluid tank 100, and a fluid supplying device 41. The first port 40a and the second port 40b are formed so as to open towards an outer side surface of the casing member 28a of the frame 2. The first communicating path 39a and the second communicating path 39b are formed in the casing member 28a. The first flow path and the second flow path are formed in the base member 29 of the frame 2. The operating fluid supply source 101 supplies operating fluid (such as pressure oil). The fluid supplying device 41 is connected to the operating fluid supply source 101.

The first flow path 38a and the first communicating path 39a connected thereto are connected between the first pressure chamber 49a and the first port 40a. The first port 40a is connected to the fluid supplying device 41 provided separately from the frame 2. The second flow path (not shown) and the second communicating path 39b connected thereto are connected between the second pressure chamber 49b and the second port 40b. The second port 40b is connected to the fluid supplying device 41.

The fluid supplying device 41 includes a selector valve (not shown) controlled by the controlling device of the machine tool. One side of the selector valve is connected to the operating fluid supply source 101 and the tank 100 at a flow path, whereas the other side of the selector valve is connected to the first port 40a and the second port 40b at a flow path. Using the selector valve, the fluid supplying device 41 selectively switches to the first port 40a or the second port 40b to supply the operating fluid having a predetermined pressure thereto supplied from the common operating fluid supply source 101, so that the operating fluid having the predetermined pressure is selectively supplied to at least one of the first pressure chamber 49a and the second pressure chamber 49b.

As shown in FIG. 2, in the clamp device 48, a clamp piston 45 is accommodated in an annular guide groove 51, formed in the protruding member 16 at the frame 2, so as to be movable in the axial line direction with respect to the guide groove 51. The guide groove 51 is formed in a portion of the protruding member 16 at the frame 2 opposing the sliding disc 43 so as to open towards the sliding disc 43. Therefore, the clamp piston 45 accommodated in the guide groove 51 is such that a circular-table-5-side end surface (that is, a sliding-disc-43-side end surface) of the clamp piston 45 opposes the sliding disc 43. A return disc 52 is interposed between the sliding disc 43 and the sliding-disc-43-side end surface of the clamp piston 45.

The return disc 52 is an elastically deformable member formed of a thin plate having a substantially doughnut shape. The return disc 52 is secured and disposed so as to be incapable of rotating with respect to the base member 29 using a flange member 54 and the protruding member 16. This prevents the clamp piston 45 from moving around as the sliding disc 43 rotates. In a state in which pressing force of the operating fluid from the fluid supplying device 41 does not act upon the clamp piston 45, the return disc 52 does not contact the sliding disc 43. In contrast, in a state in which the pressure of the operating fluid from the fluid supplying device 41 acts upon the clamp piston 45, the return disc 52 press-contacts the sliding disc 43, and the pressing force of the clamp piston 45 is transmitted to the sliding disc 43.

The clamp piston 45 includes an annular protruding portion 53 formed at a lower end of an inner peripheral portion thereof and protruding towards an inner peripheral side. At a position between the protruding portion 53 and the sliding disc 43, the annular flange member 54 is mounted to a sliding-disc-43-side end surface of the protruding member 16 at the frame 2 using a mounting bolt 32. An outer peripheral surface of the flange member 54 contacts an inner peripheral surface of the clamp piston 45 with a seal 55 being interposed therebetween.

At the side of the frame 2, a stepped portion 61 protruding radially inward from the inner peripheral surface of the base portion 11 of the base member 29 constituting a portion of the frame 2 is formed at the base portion 11. A lower surface of the stepped portion 61 (that is, a surface of the stepped portion 61 opposite to the circular table 5) opposes a circular-table-5-side surface of a pressing portion 43b that is positioned at an outer-peripheral-side end portion of the sliding disc 43. The lower surface of the stepped portion 61 functions as a friction surface 44 that is capable of contacting the pressing portion 43b of the sliding disc 43.

As mentioned above, the sliding disc 43 that is secured to the main shaft 4a is an elastically deformable member formed of a thin plate having the shape of a disc, and has a through hole for passing the main shaft 4a therethrough. While the pressing portion 43b that is positioned at the outer-peripheral-side end portion of the sliding disc 43 opposes the friction surface 44, the sliding disc 43 is secured to the main shaft 4a at a securing portion 43a that is positioned at a through-hole-side end portion of the sliding disc 43.

In the clamp device 48, a space that is surrounded by the guide groove 51 and a lower end surface 45a of the clamp piston 45 (that is, an end surface of the clamp piston 45 at a side opposite to the sliding disc 43) becomes the first pressure chamber 49a for a clamping operation. When the operating fluid supplying device 42 of the pressing force applying device 46 supplies the operating fluid having the predetermined pressure to the first pressure chamber 49a, the lower end surface 45a of the clamp piston 45 receives a pressing force in accordance with the pressure, so that the clamp piston 45 presses the sliding disc 43 through the return disc 52. As a result, the sliding disc 43 secured to the main shaft 4a is clamped by the clamp piston 45 (that is, the return disc 52) and the friction surface 44 at the frame 2, so that the main shaft 4a is in a clamped state.

Here, "clamped state" refers to a state in which the main shaft 4a is incapable of rotating as a result of applying rotation resistance that does not allow rotation of the main shaft 4a to the main shaft 4a. The "clamped state" is called a "completely clamped state." In contrast, a "partially clamped state" refers to a state in which the pressing force, used to apply rotation resistance in a range that allows rotation of the main shaft 4a, acts upon the main shaft 4a. Since the main shaft 4a is allowed to rotate in the partially clamped state, an index device (that is, the rotating table device 1) can, for example, index an angular position without any problems.

In the clamp device 48, a space that is surrounded by an inner peripheral surface 45b of the clamp piston 45, a sliding-disc-43-side surface 45c of the protruding portion 53 of the clamp piston 45, the flange member 54, and an inner peripheral surface of the guide groove 51 becomes the second pressure chamber 49b for an unclamping operation. When the aforementioned operating fluid supplying device 42 stops sending the operating fluid to the first pressure chamber 49a, and supplies the operating fluid having the predetermined pressure to the second pressure chamber 49b, the sliding-disc-43-side surface 45c of the protruding portion 53 of the clamp piston 45 receives a pressing force that is in accordance with the pressure, so that the clamp piston 45 moves away from the sliding disc 43. As a result, the "completely clamped state" is canceled, so that the main shaft 4a is in a rotatable state.

In the embodiment, the friction surface 44 and the sliding disc 43 in the clamp device 48 function as the aforementioned rotation resistance applying device. In other words, in the embodiment, a structure of a portion of the clamp device 48 also functions as the rotation resistance applying device 10.

The sliding disc 43 includes the securing portion 43a, the pressing portion 43b, and an elastic deforming portion 43c (disposed between the securing portion 43a and the pressing portion 43b) that form an integrated member. With the elastic deforming portion 43c being in a flexed state (that is, in an elastically deformed state) between a base-portion-11 side and a main-shaft-4a side of the frame 2, the securing portion 43a of the sliding disc 43 is mounted to the main-shaft-4a side. Flexing force (elastic force) of the elastic deforming portion 43c causes the pressing portion 43b to be biased towards the friction, surface 44. Therefore, a circular-table-5-side surface (that is, the pressing surface 43d) of the pressing portion 43b serving as a pressing member always press-contacts the friction surface 44 of the base portion 11 serving as a press member, so that a partially clamping pressing force, used to apply rotation resistance that allows rotation of the main shaft 4a, to always acts upon the main shaft 4a.

More specifically, a mounting surface of the main shaft 4a to which the sliding disc 43 is mounted is provided so as to be offset upward (that is, towards the side of the press member) from the friction surface 44 in the axial direction of the main shaft 4a. As a result, the elastic deforming portion 43c of the sliding disc 43 having the shape of a flat plate is flexed between the mounting surface and the friction surface 44. By the flexing force (elastic force), the pressing surface 43d of the pressing portion 43b is biased, and presses the friction surface 44. Here, the term "offset" refers to a state in which two planes are positioned parallel to each other and apart from each other by a certain distance in a direction perpendicular to the planes. An offset amount is set so that sliding resistance that is generated between the pressing portion 43b and the friction surface 44 in accordance with the elastic deformation of the elastic deforming portion 43c allows rotation of the main shaft 4a (that is, so that the main shaft 4a is not completely clamped).

In the embodiment, the rotating table device 1 described above further includes a lubricant supplying device for supplying lubricant to the rotation resistance applying device 10. The structure of the lubricant supplying device will be described with reference to FIGS. 1 to 3. FIG. 3 is a sectional view taken along line III to X in FIG. 2, and shows an exemplary structure of a supply groove 75 that is formed in the friction surface 44.

The lubricant supplying device includes a supplying device 71 that supplies lubricant to the rotation resistance applying device 10, a supplying circuit 73, nozzle holes 74, and the supply groove 75.

As shown in FIG. 1, the third communicating path 39c and the third port 40c opening towards the outer side surface of the casing member 28a of the frame 2 are formed in the casing member 28a. The third port 40c is connected to the supplying device 71 at the outer side surface of the casing member 28a. At the inner portion side of the casing member 28a, the third port 40c is connected to the supplying circuit 73, provided at the base portion 11 of the frame 2, through the third communicating path 39c and a third flow path (not shown) connected thereto.

The supplying device 71 is connected to a pressure air supply source 72. By making use of pressure air supplied from the pressure air supply source 72, the lubricant is formed into mist, so that oil mist is produced.

The supplying circuit 73 is provided at a side of the frame 2, and connects the nozzle holes 74 and the third port 40c connected to the supplying device 71. The supplying circuit 73 is formed by combining a plurality of holes that are formed in the base member 29 and the casing member 28a of the frame 2.

The nozzle holes 74 are provided so as to connect the supplying circuit 73 and the supply groove 75 to each other and so as to open from the frame 2 towards the supply groove 75. As shown in FIG. 3, four nozzle holes 74 are provided in the frame 2.

The supply groove 75 is provided so as to open at the surface of the friction surface 44, and includes a circular groove 75a, intersecting grooves 75b (corresponding to sections extending in a direction of intersection with a circumference according to the present invention), and discharge openings 75c. The circular groove 75a has a circular shape that surrounds the main shaft 4a within a contact range 80 where the friction surface 44 and the pressing surface 43d oppose each other. The intersecting grooves 75b are provided radially so as to intersect the circular groove 75a. The discharge openings 75c are connected to a portion outside the contact range 80.

The term "circumference" in which the rotational center of the main shaft 4a serves as a center refers to an imaginary circle in which the rotational center of the main shaft 4a serves as a center. The phrase "The supply groove 75 . . . includes . . . sections extending in a direction of intersection with the circumference" means that at least one location of the supply groove 75 is crossed while an imaginary point that is positioned within the contact range 80 rotates 360 degrees around the rotational center of the main shaft 4a. In other words, the phrase means that the supply groove includes a portion where the circumference having a diameter provided within the contact range 80 is intersected. Each section extending in a direction of intersection with the circumference desirably is capable of extending into an area that is greater than or equal to half of the contact range 80 in the radial direction from the viewpoint of lubrication.

In the embodiment, the intersecting grooves 75b are provided as straight grooves extending radially to an outer peripheral side of the circular groove 75a from an inner peripheral side of the circular groove 75a. A boundary of each intersecting groove 75b with a portion that is outside the contact range 80 corresponds to each discharge opening 75c. A portion of each intersecting groove 75b that is disposed outwardly of the discharge openings 75c is connected to a discharge circuit 76, and functions as an oil mist discharge path. The discharge circuit 76 is formed by combining a plurality of holes provided in the base member 29 and the casing member 28a of the frame 2. The discharge circuit 76 opens into an inside-diameter surface of the base member 29 at a position opposite to the circular table 5 with respect to the friction surface 44. The discharge circuit 76 is connected to an outer portion of the rotating table device 1 (not shown), and discharges to the outside the oil mist along with the pressure air. In the embodiment, the pressure of the discharge circuit 76 is atmospheric pressure. For example, a device for sucking the oil mist is not provided.

Figure 3:
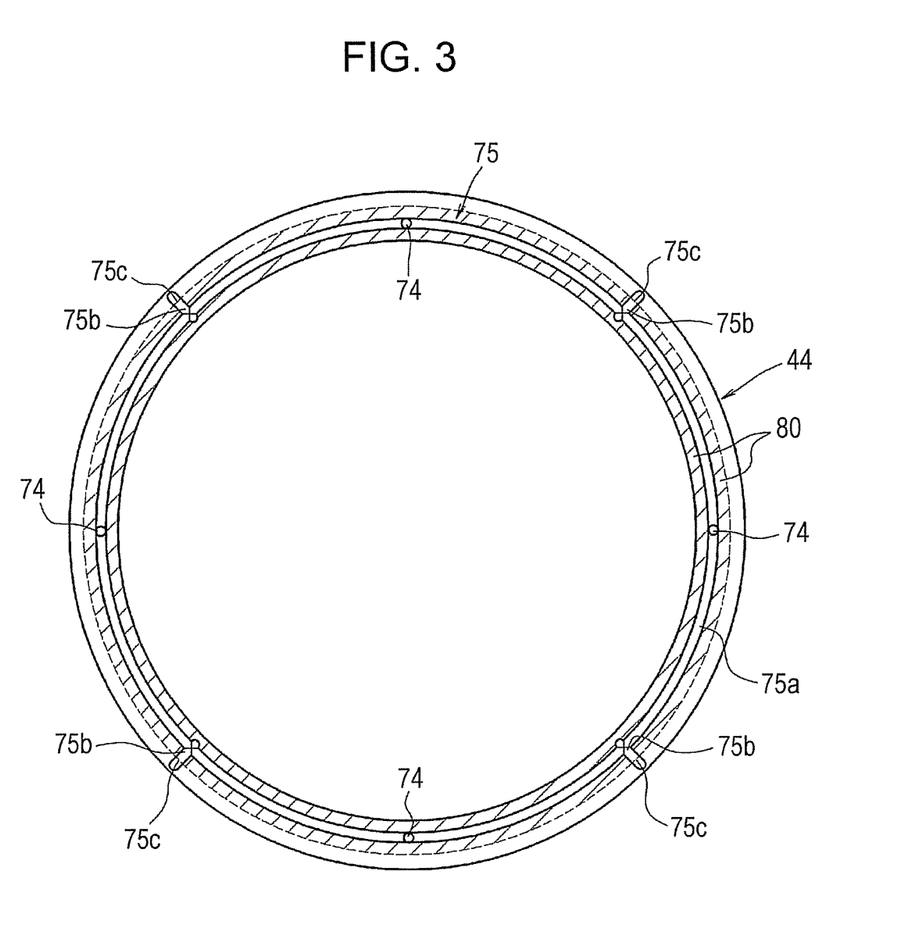
FIG. 3 is a sectional view taken along line III to X in FIG. 2, and shows an exemplary structure of a supply groove according to the embodiment.

As with the nozzle holes 74, as shown in FIG. 3, there are four intersecting grooves 75b. Therefore, the number of discharge openings 75c is four. Each nozzle hole 74 is provided between adjacent discharge openings 75c so as to open to the circular groove 75a. Accordingly, a path of passage of oil mist from when it is supplied to the circular groove 75a from the corresponding nozzle hole 74 to when it is discharged from the corresponding discharge opening 75c divides in different directions towards two of the discharge openings 75c disposed at respective sides of the corresponding nozzle hole 74 when viewed from the position where the nozzle hole 74 opens.

In the rotating table device 1 having the above-described structure, the supplying device 71 produces oil mist by forming lubricant into mist as a result of making use of pressure air supplied from the pressure air supply source 72. The supplying device 71 supplies the produced oil mist along with the pressure air, supplied from the pressure air supply source 72, to each nozzle 74 through the third port 40c, the third communicating path 39c, the third flow path (not shown), and the supplying circuit 73.

Along with the pressure air, the oil mist supplied to each nozzle hole 74 is, at a position between adjacent discharge openings 75c, discharged towards and supplied to the circular groove 74 from each nozzle hole 74. The oil mist and the pressure air discharged from each nozzle hole 74 are supplied to the circular groove 75a and the intersecting grooves 75b at two paths extending in different directions towards the corresponding two discharge openings 75c that are positioned at respective sides of the corresponding nozzle hole 74 when viewed from the position where the corresponding nozzle hole 74 opens.

As the main shaft 4a rotates, the pressing surface 43d moves in a direction of rotation with respect to the friction surface 44. Since each intersecting groove 75b opens to the friction surface 44, the pressing surface 43d also moves in the direction of rotation with respect to each intersecting groove 75b. A portion of the pressing surface 43d where each intersecting groove 75b extends is lubricated with the oil mist supplied from each intersecting groove 75b. In addition, a portion of the pressing surface 43d that is lubricated with the oil mist slides with the friction surface 44, so that a portion of the friction surface 44 within the contact range 80 is lubricated.

Each discharge opening 75c is connected to the discharge circuit 76 under atmospheric pressure (which is lower than the pressure of the pressure air). Therefore, the oil mist (and the lubricant that is provided by the oil mist) supplied to the circular groove 75a and each intersecting groove 75b is discharged along with the flow of the pressure air to the outside of the contact range 80 from each discharge opening 75c. Wear powder that is produced as the friction surface 44 and the pressing surface 43d slide is also quickly discharged along with the flow of the pressure air to the outside of the contact range 80 from each discharge opening 75c.

According to the rotating table device 1 of the embodiment having the above-described structure, in the contact range 80 in which the friction surface 44 and the pressing surface 43d oppose each other and slide as the main shaft 4a rotates, the pressing surface 43d and the four intersecting grooves 75b move relative to each other, so that the oil mist is supplied along with the pressure air to the four intersecting grooves 75b. Therefore, sufficient lubricant is supplied within the contact range 80 in which the friction surface 44 and the pressing surface 43d slide. This suppresses running out of oil films at the friction surface 44 and the pressing surface 43d, thereby making it possible to suppress wear of the friction surface 44 and the pressing surface 43d. Therefore, it is possible to maintain the magnitude of rotation resistance applied to the main shaft 4a by the rotation resistance applying device 10.

According to the rotating table device 1 of the embodiment, the path of passage of oil mist from when it is supplied to the circular groove 75a from each nozzle hole 74 to when it is discharged from each discharge opening 75c divides in different directions towards corresponding two discharge openings 75c disposed at respective sides of the corresponding nozzle hole 74 when viewed from the position where the corresponding nozzle hole 74 opens. By this, even if a portion of the circular groove 75a extending to one of the discharge openings 75c is clogged with wear powder, it is possible to allow the oil mist supplied from the nozzle hole 74 to the circular groove 75a to pass through the other discharge opening 75c. Therefore, it is possible to prevent the friction surface 44 and the pressing surface 43d from being raised by the pressure of the oil mist. Consequently, it is possible to maintain the rotation resistance applied to the main shaft 4a by the rotation resistance applying device 10 to a predetermined magnitude.

In the embodiment, the oil mist is used as a lubricant, and is supplied to the supply groove 75 along with the pressure air. Therefore, it becomes easier for the wear powder to be discharged along with the pressure air from the discharge openings 75c. Consequentially, it is possible to prevent clogging of the supply groove 75 and raising of the friction surface 44 and the pressing surface 43d by the pressure of the pressure air and the lubricant due to the clogging.

Although, in the embodiment, oil mist is produced and supplied along with the pressure air to the rotation resistance applying device 10, the present invention is not limited thereto. The lubricant may be supplied to the rotation resistance applying device 10 without being formed into mist.

Although, in the embodiment, the supply groove 75 is provided at the friction surface 44, the present invention is not limited thereto. The supply groove 75 may be provided at the pressing surface 43d of the pressing portion 43b. In addition, although, in the embodiment, the circular groove 75a and each intersecting groove 75b are flush with each other, the present invention is not limited thereto. For example, the circular groove 75a may be provided in one of the friction surface 44 and the pressing surface 43d, while each intersecting groove 75b may be provided in the other of the friction surface 44 and the pressing surface 43d.

Figure 4:
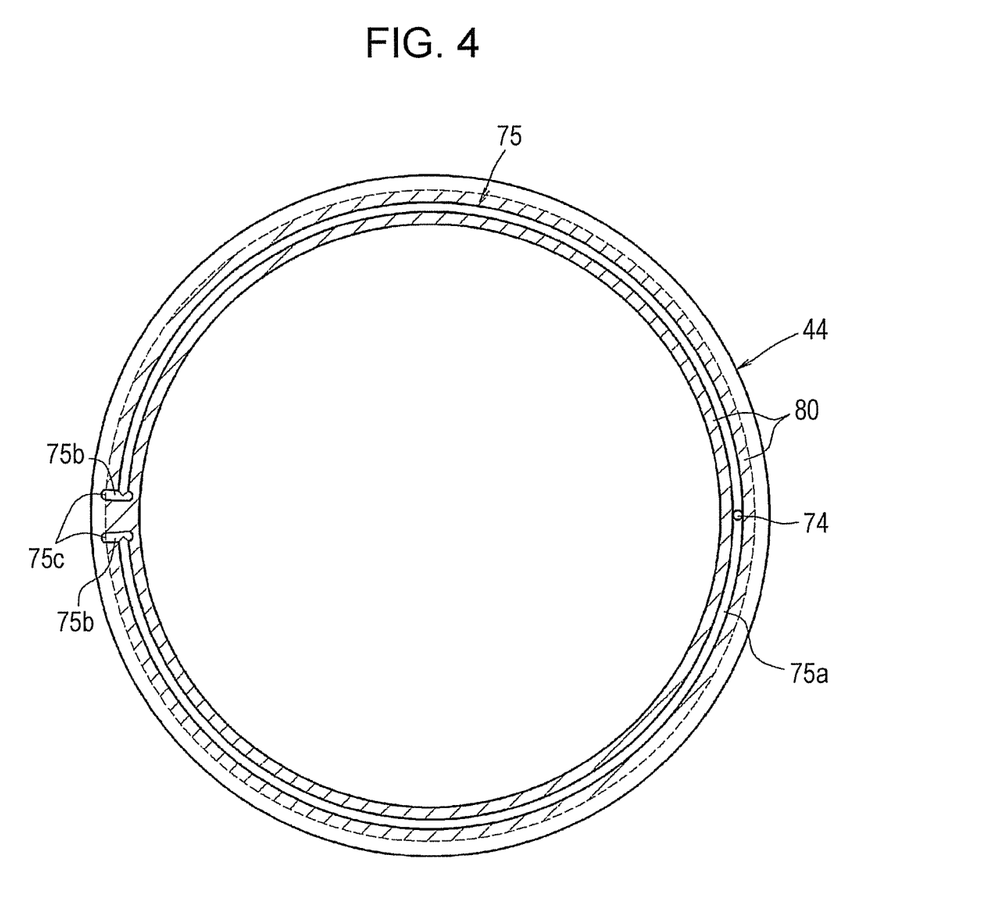
FIG. 4 is a sectional view taken along line III to X in FIG. 2, and shows another exemplary structure of the supply groove according to the embodiment.

Although, in the embodiment, the circular groove 75a is one continuous circular groove, the present invention is not limited thereto. For example, as shown in FIG. 4, the circular groove 75a may have a substantially circular shape having one portion thereof severed. That is, the supply groove 75 in the present invention need not surround the main shaft 4a along the entire circumference. All that is required is for the groove to exist around a portion of the main shaft 4a. Although, in the example shown in FIG. 4, one nozzle hole 74 and two intersecting grooves 75b are provided, one intersecting groove 75b being provided in each end of the circular groove 75a, the number of nozzle holes 74 and the intersecting grooves 75b are not limited to those in the present invention.

Although, in the embodiment, an example in which the intersecting grooves 75b of the supply groove 75 are provided as sections extending in a direction of intersection with the circumference (in which the rotational center of the main shaft 4a serves as a center) is described, the present invention is not limited thereto. For example, as shown in FIG. 5, the center of the circular groove 75a may be shifted from the rotational center of the main shaft 4a, and the sections may be formed as those that extend in a direction of intersection with a direction along the circumference of the circular groove 75 itself, so that it is possible to supply oil mist in a directional range in which the sections intersect the circumference as the main shaft 4a rotates.

Figure 5:
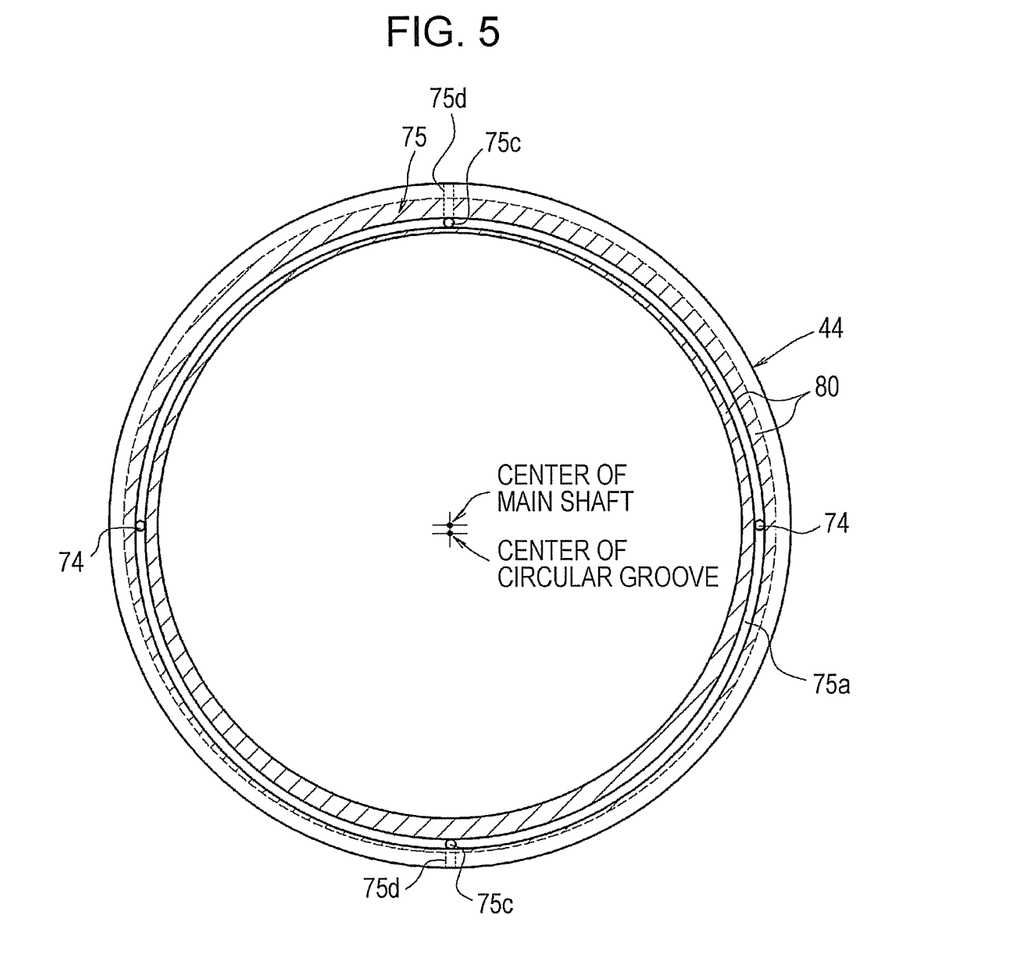
FIG. 5 is a sectional view taken along line III to X in FIG. 2, and shows another exemplary structure of the supply groove according to the embodiment.

In the example shown in FIG. 5, intersecting grooves 75b do not exist, and the circular groove 75a whose center is shifted from the center of the main shaft 4a in the direction of intersection serves as a section that extends in the direction of intersection. That is, in the supply groove shown in FIG. 5, the positions in the radial direction within the contact range 80 on the circumference differ. In addition, the supply groove intersects two locations of an imaginary circle that is drawn within the contact range 80 with the rotational center of the main shaft 4a serving as a center Therefore, the entire supply groove serves as a section that intersects the circumference in which the rotational center of the main shaft 4a serves as a center. The discharge openings 75c are provided so as to open to portions of the circular groove 75a. More specifically, communicating holes 75d (tunnels in the interior of the member) are provided, one side of each communicating hole 75d opening to a location that is outside the contact range 80 and the other side of each communicating hole 75d opening to the circular groove 75a. Portions that open to the circular groove 75a serve as the discharge openings 75c. Although, in the example shown in FIG. 5, two nozzle holes 74 and two discharge openings 75c are provided, the present invention is not limited thereto.

Figure 6:
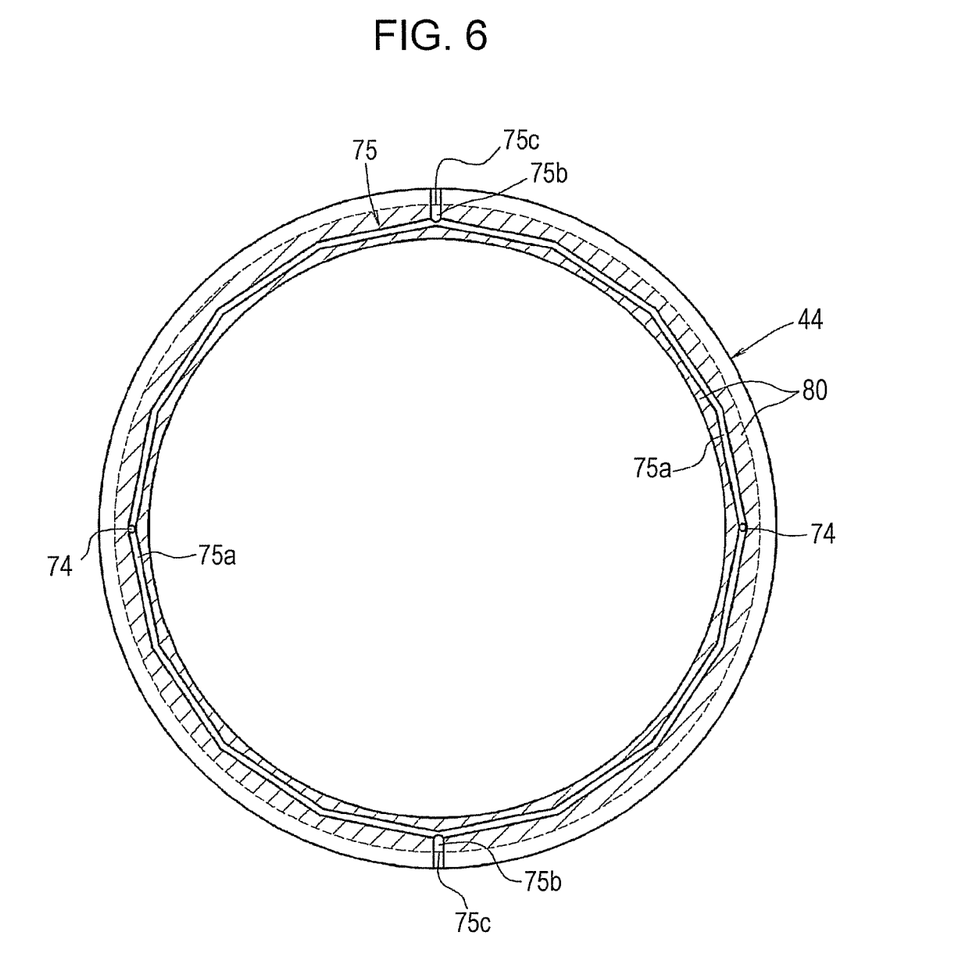
FIG. 6 is a sectional view taken along line III to X in FIG. 2, and shows another exemplary structure of the supply groove according to the embodiment.

Although, in the embodiment, the circular groove 75a is described as being a circular groove, the present invention is not limited thereto. For example, the groove 75a may be an elliptical groove, or may include a combination of curved and straight grooves so as to surround the main shaft 4a. FIG. 6 shows an exemplary structure in which the circular groove 75a is formed by combining a plurality of straight grooves. In FIG. 6, the circular groove 75a is formed by combining straight grooves that are formed substantially along a circumferential direction.

Figure 7:
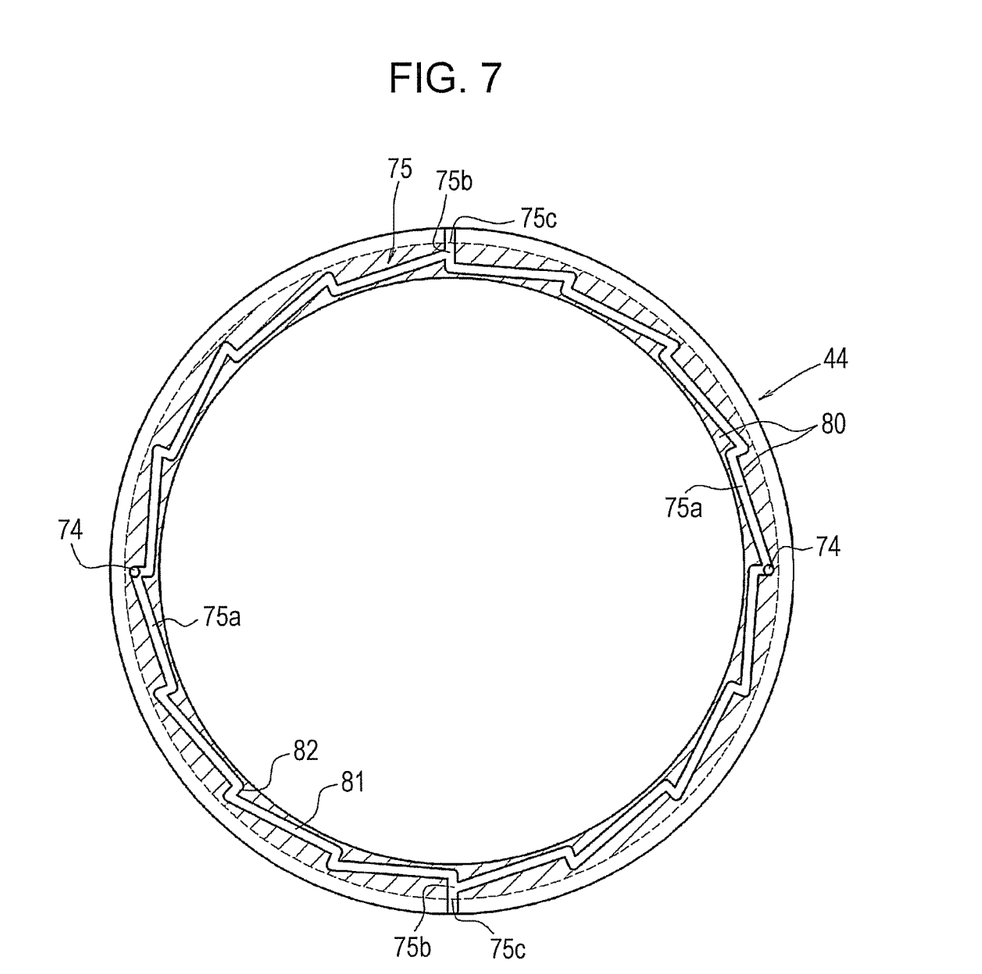
FIG. 7 is a sectional view taken along line III to X in FIG. 2, and shows another exemplary structure of the supply groove according to the embodiment.

FIG. 7 shows an exemplary structure in which the circular groove 75a is formed by combining a plurality of straight grooves. In FIG. 7, the circular groove 75a is formed by combining straight sections 81 that are straight in the circumferential direction and straight sections 82 that are formed along a direction that intersects the circumference.

If the circular groove 75*a* is formed as shown in FIG. 6 or FIG. 7, the number of sections of the supply groove 75 extending along a direction of intersection with the circumference is considerably increase because, in addition to the intersecting grooves 75*b*, the straight sections 81 and 82 and the circular groove 75*a* formed by combining straight grooves are formed. Therefore, it becomes easier for the oil mist to reach a position within the contact range 80, thereby making it possible to increase lubrication effect between the friction surface 44 and the pressing surface 43*d*.

Figure 8:
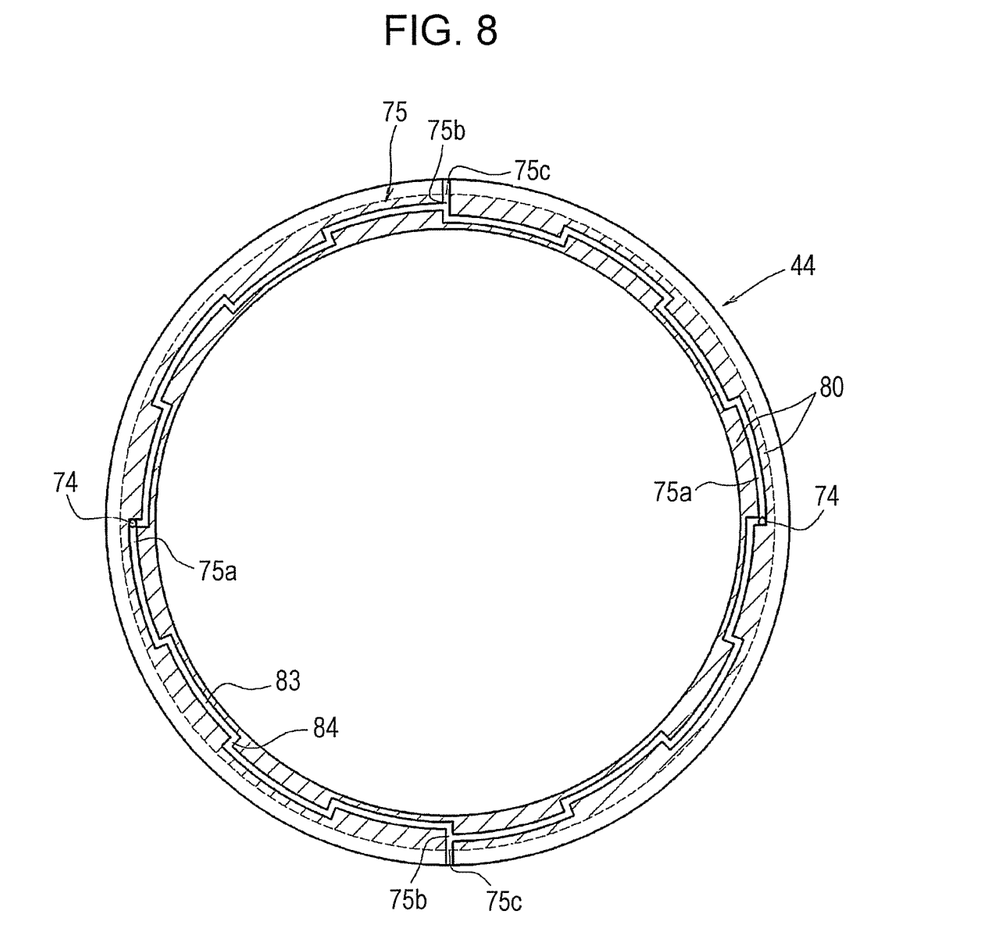
FIG. 8 is a sectional view taken along line III to X in FIG. 2, and shows another exemplary structure of the supply groove according to the embodiment.

FIG. 8 shows an exemplary structure in which the circular groove 75*a* is formed by combining a plurality of arc-shaped grooves and a plurality of straight grooves. In FIG. 8, the circular groove 75*a* is formed by combining arc-shaped sections 83 and straight sections 84. In each section 83, the rotational center of the main shaft 4*a* serves as a center. The straight sections 84 are radially formed so as to intersect the circumference. If the circular groove 75*a* is formed thus, the number of sections of the supply groove 75 extending along a direction of intersection with the circumference is considerably increase because, in addition to the intersecting grooves 75*b*, the straight sections 84 are formed. Therefore, it is possible to increase lubrication effect between the friction surface 44 and the pressing surface 43*d*.

Figure 9:
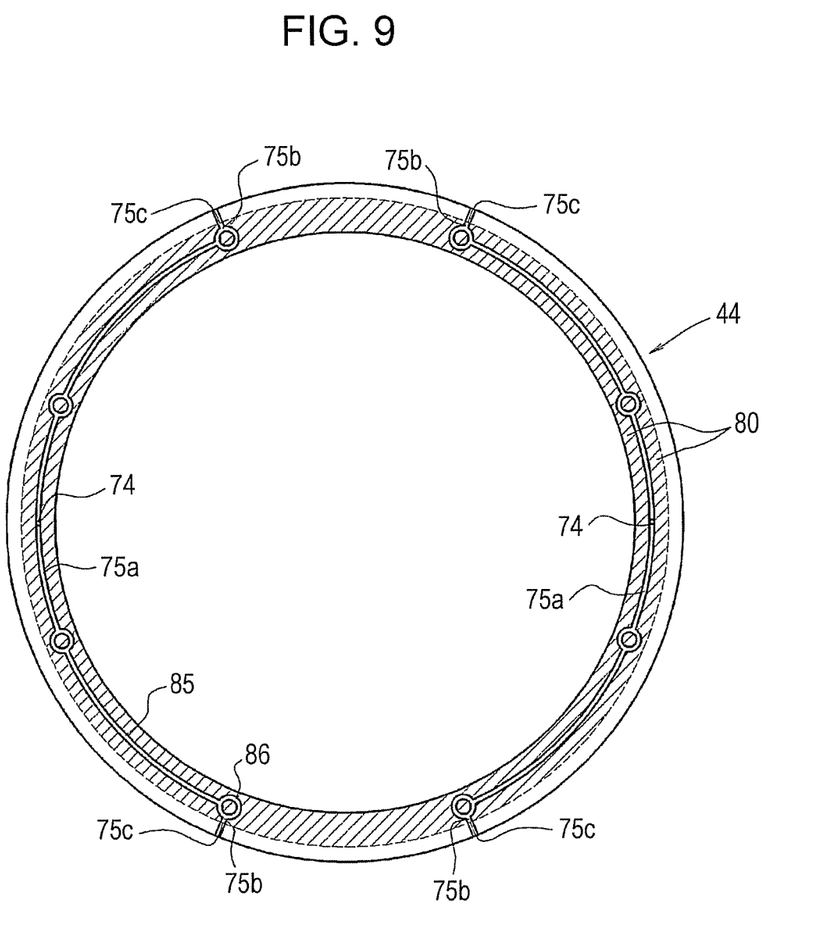
FIG. 9 is a sectional view taken along line III to X in FIG. 2, and shows another exemplary structure of the supply groove according to the embodiment.

FIG. 9 shows an exemplary structure in which the circular groove 75*a* is formed by combining a plurality of arc-shaped grooves and a plurality of circular grooves. In FIG. 9, the circular groove 75*a* is formed by combining arc-shaped sections 85 and circular sections 86. In each section 85, the rotational center of the main shaft 4*a* serves as a center. If the circular groove 75*a* is formed thus, the number of sections of the supply groove 75 extending along a direction of intersection with the circumference is considerably increased because, in addition to the intersecting grooves 75*b*, the circular sections 86 are formed. Therefore, it is possible to increase lubrication effect between the friction surface 44 and the pressing surface 43*d*.

Figure 10:
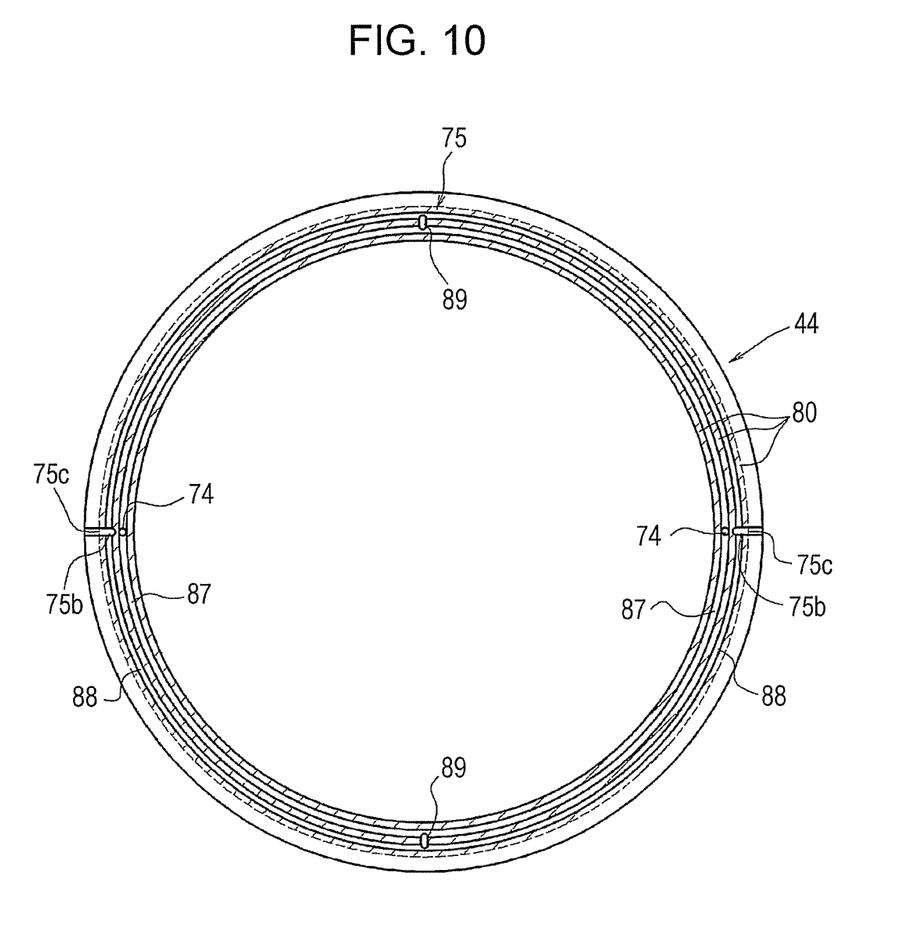
FIG. 10 is a sectional view taken along line III to X in FIG. 2, and shows another exemplary structure of the supply groove according to the embodiment.

As shown in FIG. 10, the supply groove 75 may be formed by providing a plurality of circular grooves 87 and 88 and connecting the grooves 87 and 88 with a plurality of straight grooves 89. Although, in FIG. 10, two straight grooves 89 extending in the radial direction intersecting the circular grooves 87 and 88 in which the rotational center of the main shaft 4*a* is a center are provided, more straight grooves 89 may be formed. If the circular groove 75*a* is formed thus, the number of sections of the supply groove 75 extending along a direction of intersection with the circumference is considerably increased because, in addition to the intersecting grooves 75*b*, the straight sections 89 are formed. Therefore, it is possible to increase lubrication effect between the friction surface 44 and the pressing surface 43*d*.

Although, in the embodiment, the nozzle holes 74 are formed in the frame 2, the present invention is not limited thereto. For example, after providing the supplying circuit 73 at the main shaft 4*a* using, for example, a rotary joint, the nozzle holes 74 may be provided in the main shaft 4*a*. In addition, although, in the embodiment, the nozzle holes 74 are provided in the same member as the supply grooves 75, the nozzle holes 74 may be provided so as to open towards the supply groove 75 from a member that differs from that where the supply groove 75 is provided.

Although, in the embodiment, the positions where the nozzle holes 74 open to the supply groove 75 are intermediate positions between two adjacent intersecting grooves 75*b*, the present invention is not limited thereto. For example, the positions where the nozzle holes 74 open to the supply groove 75 may be situated closer to either one of the two intersecting grooves 75*b* instead of being situated at equal distances from the two intersecting grooves 75*b*.

Although, in the embodiment, the rotation resistance applying device is such that the sliding disc 43 is provided at the main shaft 4*a* and the friction surface 44 is provided at the frame, the present invention is not limited thereto. For example, the sliding disc 43 may be provided at the frame 2, and the friction surface 44 may be provided at the main shaft 4*a*. Alternatively, a surface of the circular table 5 may be provided as the friction surface 44.

Although, in the embodiment, the rotation resistance applying device is such that the sliding disc 43 is flexed by offsetting the position of the circular-table-5-side surface of the securing portion 43*a* of the sliding disc 43 and the position of the friction surface 44, the present invention is not limited thereto. For example, it is possible to use a sliding disc having a sectional shape formed by previously curving the sliding disc by a flexing amount, and mounting the sliding disc extending in a plane without offsetting the position of the circular-table-5-side surface of the securing portion 43*a* of the sliding disc 43 and the position of the friction surface 44. Alternatively, it is possible to use a sliding disc having a sectional shape formed by previously curving the sliding disc, and to offset the circular-table-5-side surface of the securing portion 43*a* of the sliding disc 43 and the position of the friction surface 44.

Although, in the embodiment, the disc-type rotation resistance applying device 10 in which the flexing force of the sliding disc 43 itself causes a partial clamping pressing force (used to apply rotation resistance that allows rotation of the main shaft 4*a*) to always act upon the friction surface 44 at the frame 2 is used, the present invention is not limited thereto. For example, it is possible to use a piston-type rotation resistance applying device in which a pressing surface of a piston presses a press-contact surface of the main shaft 4*a*, so that a partial clamping pressing force is generated when necessary. In this case, lubricant or oil mist may be supplied to the supply groove 75 only when the partial clamping pressing force is generated.

Although, in the embodiment, the rotating table device 1 using the DD motor 6 as a driving device is described, the present invention is not limited to a rotating table device using a DD motor. That is, the driving device may include a motor and a reduction gear.

Although, in the embodiment, an index device (such as the rotating table device 1) is used as an exemplary main shaft drive, the present invention is not limited thereto. For example, the index device may be a main shaft drive for a machine tool in which a main shaft to which, for example, a tool is mounted is continuously rotationally driven. More specifically, the index device may be a workpiece main shaft device of a composite processing machine tool or a milling head (universal head or spindle head) for a machine tool.

Although an embodiment is described with reference to specific forms for carrying out the present invention, the present invention is not limited thereto. Therefore, the embodiment is not to be interpreted as limiting the technical scope of the present invention. That is, the present invention may be carried out in various forms as long as they do not depart from the spirit and essential features of the invention.

What is claimed is:

1. A main shaft drive for a machine tool, comprising:
   a rotation resistance applying device that applies rotation resistance to a main shaft by causing a pressing surface of a pressing member to press-contact a friction surface of a press member when the main shaft is rotationally driven, the main shaft being rotatably supported by a frame;

a supplying device provided at a side of the frame, the supplying device supplying lubricant to the rotation resistance applying device;

a nozzle hole for supplying the lubricant;

a supplying circuit provided at at least one of the side of the frame and a side of the main shaft, the supplying circuit connecting the supplying device and the nozzle hole to each other; and a supply groove for the lubricant, the supply groove being provided so as to open to at least one of the friction surface and the pressing surface, wherein the nozzle hole opens towards the supply groove, and wherein the supply groove extends so as to surround the main shaft within a range where the friction surface and the pressing surface oppose each other, and wherein the supply groove includes a section that is provided by at least a part of the supply groove and that intersects a circumference in which a rotational center of the main shaft is a center, and a discharge opening that is connected to a location that is outside the range where the friction surface and the pressing surface oppose each other.

2. The main shaft drive for a machine tool according to claim 1, wherein the supply groove includes at least two of the discharge openings, and wherein the nozzle hole opens to the supply groove at a portion thereof between the discharge openings that are adjacent to each other.

* * * * *